United States Patent [19]

Hooker, III et al.

[11] 4,321,627

[45] Mar. 23, 1982

[54] OPTICAL SCANNER FOR INK JET PRINTER

[75] Inventors: Ross B. Hooker, III, Boulder, Colo.; Wilson M. Routt, Jr., Lexington, Ky.

[73] Assignee: International Business Machines Corporation, Armonk, N.Y.

[21] Appl. No.: 77,284

[22] Filed: Sep. 20, 1979

[51] Int. Cl.³ .......................... H04N 1/10; H04N 1/42
[52] U.S. Cl. .................................. 358/286; 358/285; 358/293
[58] Field of Search ............... 358/285, 293, 286, 294, 358/296

[56] References Cited

U.S. PATENT DOCUMENTS

| Re. 28,219 | 10/1974 | Taylor et al. | 346/75 |
|---|---|---|---|
| 3,272,918 | 9/1966 | Koll et al. | 358/287 |
| 3,445,598 | 5/1969 | Green et al. | 358/286 |
| 3,632,871 | 1/1972 | Watkins | 178/7.6 |
| 3,800,076 | 3/1974 | Koizumi | 358/286 |
| 4,009,332 | 2/1977 | Van Hook | 358/280 |
| 4,063,254 | 12/1977 | Fox et al. | 346/75 |
| 4,069,486 | 1/1978 | Fox | 346/75 |
| 4,106,061 | 8/1978 | Burnett | 358/296 |
| 4,112,469 | 9/1978 | Paranjpe et al. | 358/293 |
| 4,155,103 | 5/1979 | Gamblin et al. | 358/296 |

FOREIGN PATENT DOCUMENTS 1424674  2/1976  United Kingdom ................ 358/293

OTHER PUBLICATIONS

Latta-Laser Raster Scanner-IBM Tech Disclosure Bulletin, vol. 13, #12, May 1971, pp. 3879-3880.

Primary Examiner—Joseph A. Orsino, Jr.
Attorney, Agent, or Firm—Fraser and Bogucki

[57] ABSTRACT

A system for reproducing the image on a document comprises a scanning system including a galvanometer driven mirror which reflects a collimated image of an illuminated band via a focusing lens system onto a line array of photosensitive elements. Relative movement between the scanning system and the document causes the scan of successive bands across the document, generating signals at the photosensitive elements that represent line image variations. The photosensitive elements are arranged in 1:1 correspondence to individual ones of a line array of ink jet printers disposed adjacent a copy document. Both the signal generating and image reproducing systems scan their associated documents in synchronism so that the image may be reproduced in direct fashion or using interleaving for higher density with given inter-element spacing. Such systems may provide real time copy reproduction with or without change of image size and insertion of digitally generated data, or electronic processing may be used for altered or delayed reproduction.

1 Claim, 6 Drawing Figures

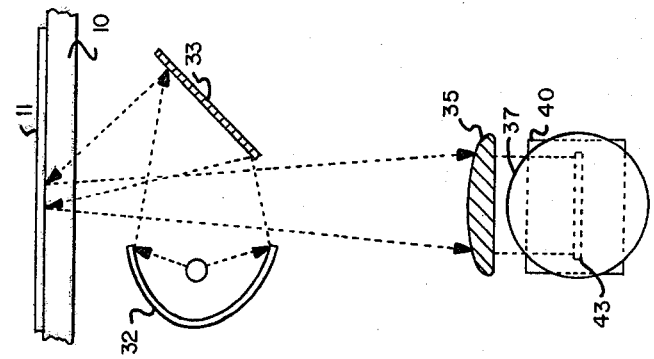
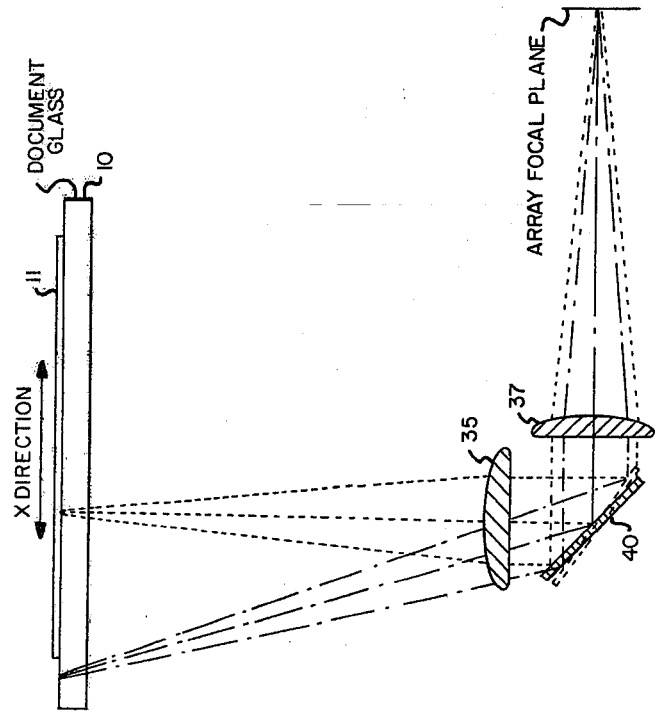

OPTICAL SCANNER FOR INK JET PRINTER

BACKGROUND OF THE INVENTION

Modern technology has produced a wide variety of image reproduction devices based upon different techniques for creating a hard copy. One technique which has become increasingly more popular due to its versatility is reproduction by an ink jet printer of an image derived by scanning a document. The ink jet printer in this system utilizes an array of small nozzles through which minute quantities of ink may be controllably expelled with sufficient force to coat a substrate upon which a reproduction is to be created.

Resolution and print speed are enhanced in current state of the art ink jet printers by incorporating a plurality of linear arrays of ink jet nozzles positioned so that the relative position of ink jets in adjacent arrays is staggered. Examples of this technique are contained in U.S. Pat. No. Re. 28,219 issued to R. P. Taylor et al on "Image Construction System Using Multiple Arrays Of Drop Generators" and U.S. Pat. No. 4,009,332 on "Memory Management System For An Ink Jet Copier".

The Taylor et al U.S. Pat. No. Re. 28,219 illustrates, as a principal embodiment, a configuration in which staggered ink jet arrays are driven by banks of photosensors which are directly coupled to the ink jets via amplification means. In this system, the original being copied is mounted on a drum having an internal illumination source and the photosensor banks are positioned adjacent to the outer periphery of the drum so that as the drum is rotated, translucent images create signal variations which are used to drive the associated ink jet arrays. This is a complex structure and the illumination technique diffuses the image and reduces resolution.

The Van Hook system disclosed in U.S. Pat. No. 4,009,332 processes electrical signals from a document scanner and stores the signals in a memory capable of activating individual nozzles on a predetermined and interlaced basis. The interlacing effect is enhanced by moving the nozzles relative to a rotating, copy receptor carrying drum so that the individual nozzles follow a diagonal track across the copy receptor.

The size of the originals which may be copied by current state of the art ink jet printers is limited by the size and placement of their photoelectric scanning arrays. For instance, in the Taylor et al patent the banks of photodetectors must be as wide as the copy being scanned. In systems such as that disclosed by Taylor et al, redundant photosensor banks are required to ensure proper overlapping of individual image areas to enhance resolution.

Further drawbacks are encountered by current state of the art ink jet printers due to their scanning arrangement whereby the image area of a single photosensor in a bank is controlled by the physical dimensions of the electronic device. This creates significant problems, including decreased resolution, when the printers are utilized to create enlargements of significant ratios such as are encountered when going from a microfilm copy to a standard sized document.

Prior to the present invention, ink jet printers used a great number of photosensors and ink jet nozzles to obtain blanket coverage of the original and copy receptor media to produce copy results of acceptable resolution.

Watkins, U.S. Pat. No. 3,632,871 on "Optical Scanning Device" is exemplary of current state of the art systems which use a rotating reflecting surface to direct an image onto a photoresponsive element.

SUMMARY OF THE INVENTION

In accordance with the present invention, a scanning system for an ink jet printer or copier incorporates a scanning device which cooperates with a light source that illuminates a band extending lengthwise along a first axis relative to a source document. A lens system first collimates the light reflected off the source document onto an interposed scanning mirror which scans along the first axis, and the lens system then focuses the light onto a line array of photosensitive elements. These elements are mounted along a second axis relative to the source document, this axis being orthogonal to the first, and corresponding to the width of the light band. The system scans a document to be copied as an ink jet array is translated correspondingly and synchronously across an image receptor medium. Using a one-to-one correspondence between individual detectors and printer heads to energize the ink jet elements in real time, a copy is generated without a need for intermediate storage or data processing. The number of elements in the photosensitive array and the number of ink jet nozzles in that array are selected to obtain the desired system resolution and high speed operation.

The scanning system may be translated down the length of a stationary document as a line illumination means sequentially illuminates a strip extending across the document in the first direction and an oscillating mirror reflects a group of moving line images concurrently onto the photodiode array. The receptor media may be mounted on a drum rotated synchronously with alternation of the scanning mechanism. In this exemplification, the ink jet array may be translated by the same carriage as the line illumination source and the photodiode array, so as to cause an image to be generated on a moving receptor media in real time.

In accordance with another aspect of the present invention, the scanning system is fixed and the document to be copied is transported across an illumination slot. An oscillating mirror sequentially reflects the data in a single line in a serial fashion onto a diode array, signals from which energize the elements of an ink jet line array that is translated by a carriage across the copy receptor media if real time copying is desired.

Versions of both of the above exemplifications may incorporate electronic signal processing means whereby the output of the data array may be manipulated for real time or delayed energization of the ink jet assembly. For higher printing resolution with a given spacing between photosensitive and printing elements an interlace technique may be employed.

BRIEF DESCRIPTION OF THE DRAWINGS

A better understanding of the invention may be had by reference to the following description, taken together with the accompanying drawings, in which:

FIG. 2 is a schematic side view of the optical path of the arrangement of FIG. 1;

FIG. 3 is a schematic end view of the optical path of FIG. 2;

DETAILED DESCRIPTION OF THE INVENTION

Figure 1:
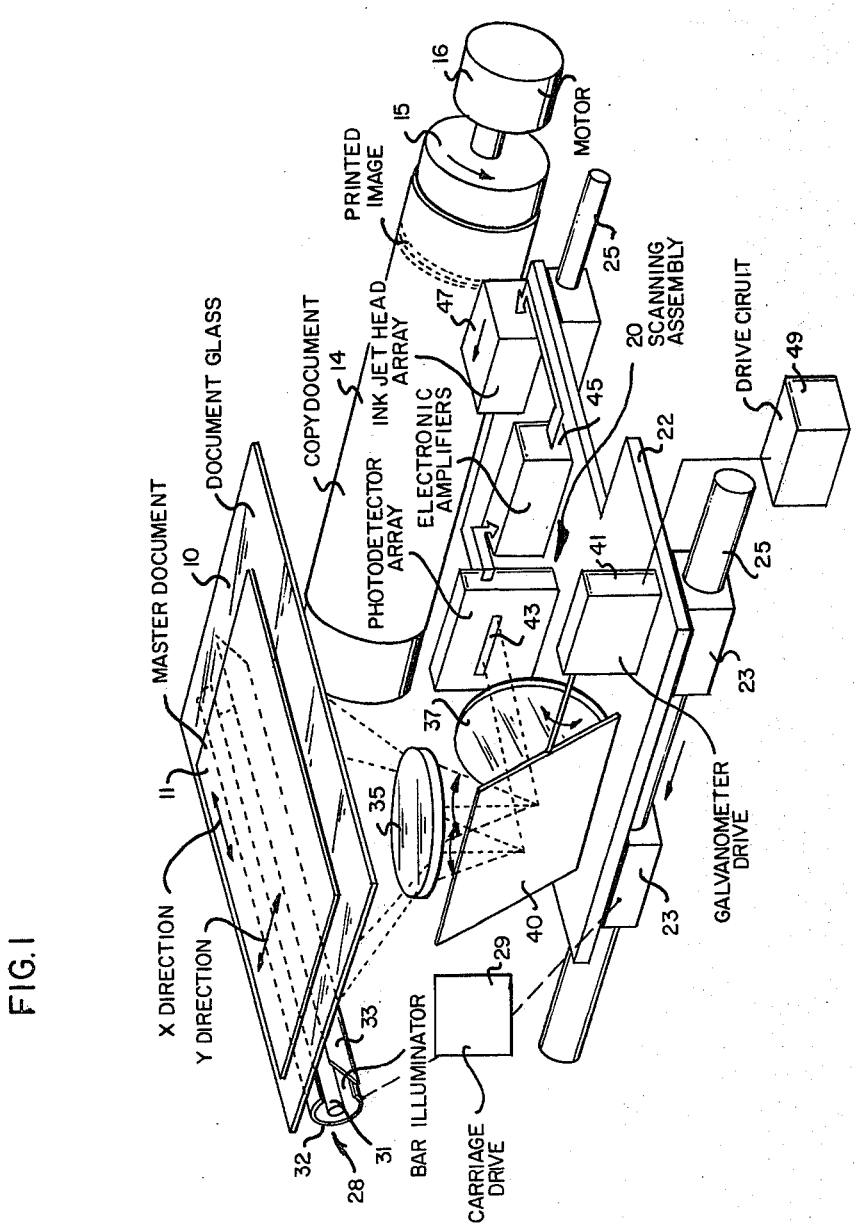
FIG. 1 is a schematic representation of an ink jet printing system wherein a scanning system on a carriage moves across a stationary document platen.

FIG. 1 illustrates a system in accordance with the invention that incorporates a flat bed scanning arrangement. A document glass or platen 10 forms a stationary, flat surface upon which a master or original document 11 to be copied is placed, printed side down. A copy receptor media or document 14 is wrapped about and transported by a revolving drum 15 that is driven at a chosen rate by a motor 16. A scanning assembly 20 is transported along the length of the document glass 10 so that the document 11 may be sequentially scanned while a copy is simultaneously reproduced on the media 14 supported by the rotating drum 15.

The scanning assembly 20 includes a carriage 22 which is supported by bearings 23 riding on a pair of guide rails 25. The rails 25 are parallel to each other and to the document glass 10, and also parallel to the longitudinal axis of the drum 15. Thus an optical system and a printing system supported on the carriage 22 are transported in a uniform manner with respect to both the document glass 10 and the drum 15.

A bar illuminator 28 is coupled to the carriage 22 and moves along the underside of the document glass 10 with the carriage 22 being advanced by a carriage drive 29 that operates at a selected rate. The bar illuminator 28 is a standard, elongated illumination means of the type normally found in photocopy systems, and comprises an elongated lamp 31 within a curved reflector 32 which directs light onto the document 11 off a spaced apart flat reflector 33. Reflected light from the document 11 is then directed downwardly between the reflectors 32, 33.

In addition to the bar illuminator 28, the carriage 22 supports a scanning system comprised of collimating and focusing lens assemblies, each of which may be a plurality of lens elements or a single lens, depending upon the system requirements, such as enlargement or reduction functions. In this example the lens system comprises a collimating lens 35 and a focusing lens 37 successively disposed along the path of reflected light from the document 11. Between the lenses 35, 37, the light is reflected off an oscillating mirror 40 which is driven by a galvanometer 41. The collimating lens 35 is configured so that the image reflected from any point across the width of the master document 11 falls on the oscillating mirror 40 without defocusing because of the varying positions of the mirror or any typical deviations of the document 11 from its principal plane. Thus when the image is transmitted through the focusing lens system 37 an undistorted and focused image impinges on a photodetector array 43 at the focal plane of the lens 37. The direction of elongation of the bar illuminator 28 relative to the master document 11 is here termed the first axis, or X direction while the axis orthogonal thereto in the plane of the master document 11 is the second axis, or Y direction. FIGS. 2 and 3, to which reference is now additionally made, are useful in helping one to visualize how a band of light having a predetermined width in the Y direction is illuminated along the X direction of the master document 11, depending upon the relative position of the bar illuminator. As seen in FIG. 2, a short line image corresponding to the width (Y direction) of the band of light is directed onto the line of photodiodes in the photodetector array 43. This short scanning line moves, as the mirror 40 oscillates, to scan the illuminated band along the X direction. Thus, in effect, the system concurrently scans a number of individual lines along the X direction, because each detector in the array is responsive only to the light intensity variations along its particular line.

Electronic impulses generated at the photodetector array in response to the image directed thereon by the oscillating mirror are passed through electronic circuits containing amplifiers which increase signal power sufficiently to drive individual jets in an array 47 of ink jet heads. In this example, there are an identical number of photodiodes in the photodetector array 43 and ink jets in the ink jet head array 47. There is also a one-to-one correspondence in movement between the master 11 and the copy 14, so that the copy is of the same size and like resolution.

The bar illuminator 28 thus illuminates a band of a given dimension along the second axis and extending transversely across the master document 11 along the first axis. Reflected light from a given line on this light band is collimated by the lens 35 so as to fall on the scanning mirror 40, whose pivot axis is preferably symmetrically centered relative to both the master document 11 and the lens 35. As the scanning mirror 40 is pivoted through a selected arc, the focused line image of reflected light is shifted along the first axis but continues to fall in focus on the linear photodetector array 43 due to the focusing lens 37. The individual photodiodes operate continuously but subdivide the short line images transversely into separate concurrent segments. Thus as scanning continues there are a number of concurrent signal sequences provided, each representing light intensity variations on the master document 11 along a different line parallel to the first axis. Therefore, the signal from each detector is then applied on a 1:1 basis to a different separate ink jet head in the array 47, via the amplifiers 45. Known ink jet recorder devices have a bandwidth of approximately 130 KHz, which in turn means that each of the parallel amplifying channels can employ relatively inexpensive, low bandwidth amplifiers. Consequently an image is formed on the copy document that has, in this example, a 1:1 correspondence to the master document.

The scanning system can readily accommodate conventional document sizes (e.g. 10½" to 13" widths) without losing focus. For example, a 22° angle of scan is sufficient for this purpose and can readily be accommodated by galvanometer drives. It is preferred in this example to drive the galvanometer with a wave shaping circuit 49 which provides a sawtooth or a half-cycle sine wave function with a fast return. This enables a brief dead time interval that exists between the leading and trailing edges of the copy document 14 to serve as a scan return interval so that scanning of the next band can commence. For conventional document sizes, the galvanometer rate will typically be in the range of 150 to 200 Hz, although it can be substantially higher if desired. The mirror drive may be a resonant (e.g. vibrating) system as well as a system driven by control signals. Typical galvanometers presently on the market provide output signals to denote the limit of travel in one or both directions, and such signals can conveniently be used for synchronization of the document drives.

Each successive band across the master document is then scanned in similar fashion, as the carriage 22 is moved longitudinally relative to the master document 11. Preferably this is accomplished in this example by using a drive 29 of the incremental motion type, which advances the carriage 22 by a selected precise distance after every scan so that neither gaps nor overlap are introduced. It will be recognized that a slanted scan can be used, with both transverse and longitudinal motions being continuous, but in this event the dead time interval between successive scans should be low so that interband gaps do not appear.

In a preferred embodiment, the photodetector array 43 is comprised of a line of square photodiodes approximately 10 mils on a side. The actual number of diodes in the array is very small with respect to the larger arrays currently in use which blanket the total width of a document being scanned. The United Detector Technology Corporation type 50A is exemplary of a photodiode array which is compatible with the system.

A 1:1 correspondence between photodiodes and the ink jet devices may impose limitations on the resolution that can be achieved, because of limitations on device density, particularly at the printer end. However there are a number of approaches that can be used for increasing resolution without substantially increasing complexity. As one example, the detectors and ink jets need not be linearly arrayed but can be alternated with respect to a mid-line for greater packing density. Such a photodiode array is the equivalent of two slightly offset linear arrays, and these can be illuminated simultaneously by appropriate offset of the alternate photodiodes within the focal plane along the direction of scan to positions at which adequate illumination is still provided. The sensitivity of the photodiodes is adequately high to maintain the needed response time, and with a corresponding disposition of ink jets image reproduction is maintained between adjacent lines in the reproduced copy.

Alternatively, an interleaving technique may be employed, as described in the Van Hook U.S. Pat. No. 4,009,332 mentioned above, or as described in U.S. Pat. No. 4,063,254 to Fox et al or U.S. Pat. No. 4,069,486 to Fox. In these systems the interleaving sequence is based upon the entry of line scan data into memory, and controlled reading of information signals from memory to operate ink jet nozzles in a plurality of linear arrays. The system enables center to center nozzle spacings to be larger than the dot spacings on the paper, with little sacrifice of either printing speed or resolution. Restraints imposed on resolution by ink jet nozzle size, or photodetector size, or both, can also be overcome without the use of a memory. For example, detector elements and ink jet nozzles can be spaced apart by a given number, k, of dot rows within the illuminated band. The scanning mechanism may then be advanced by a 1/k increment for each scan, printing successive spaced apart line groups which ultimately fill the spaces allotted to each ink jet nozzle. The entire scanning mechanism must then be advanced so that the first line of the first ink jet nozzle is printed adjacent the last line of the last ink jet nozzle that was printed during the previous run. In this system the advantages of real time recording with 1:1 correspondence between detector and ink jet nozzle can for many applications outweigh the time lost in advancing the scanning mechanism without printing.

It is feasible in systems in accordance with the invention to provide a resolution of 420×420 dots per inch, which provides a print image of excellent typewriter quality. However, other recorder mechanisms could also be used including thermal print heads or dot impact hammers, such as are conventionally employed for dot matrix character generation. While such mechanisms generally do not provide resolution and printing rates directly comparable to ink jet devices, they nevertheless can be used as the recording element for particular applications. It should also be recognized that a different output system, such as cathode ray tube, can also be employed to provide a graphic display, with or without a record, of the scanned image. To generate patterns on a cathode ray tube corresponding to the signals picked up by the photodetector array, the deflection system can be switched between the different line scan positions at a high rate. Concurrently the signal levels in the successive line positions can be sampled, so as to display multiple output line images corresponding to the multiple input line images being scanned by the photodetector array and associated system. If a storage tube is used, the composite image can be generated concurrently so that they may be viewed, whether or not interleaved line scans are used. This image can also be recorded on microfilm or other photographic media. Obviously, however, if only a film record is to be provided a storage tube need not be utilized because the film accumulates the successive sets of line scans automatically, in proper juxtaposition.

In FIG. 1, the document glass 10 is stationary and adapted to support a master document 11 so that it may be scanned by a moving optical system which is mechanically coupled to a print head to eliminate complex synchronization means found in many photocopy systems.

Figure 4:
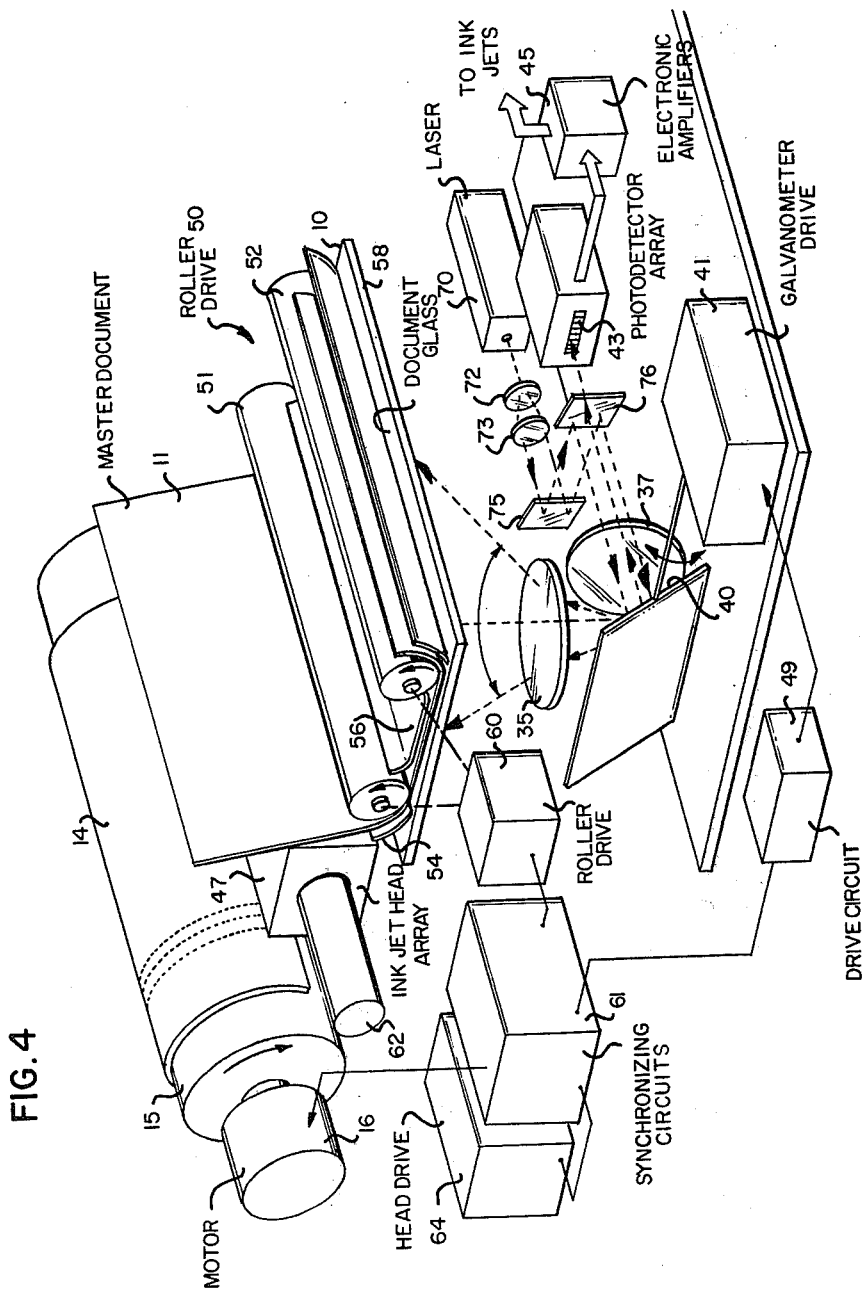
FIG. 4 is a perspective idealized representation of a different example of an image reproducing system of the present invention wherein a different scanning arrangement is utilized.

FIG. 4 illustrates a different example in which a different type of drive arrangement and a different illuminating system are utilized. In this example, elements and devices corresponding to those of the example of FIG. 1 are similarly numbered where they function in a corresponding fashion. There are, however, a significant number of differences that should be noted. The master document 11 is in this example moved across a stationary document glass 10 by a roller drive 50 comprising a pair of spaced apart rollers 51, 52 positioned just above the document glass 10. The master document 11 is moved across an exposure position by the roller drive 50, which may incorporate pinch rollers (not shown), an endless drive belt (not shown) or other conventional mechanisms. For ease of illustration, the document 11 is shown fed into the space between a first roller 51 and the document glass 10 by a curved diverter 54 at the entry end, held down in position adjacent the document glass along what may be termed an image axis by a guide 56 and then returned to an upwardly directed path by an exit diverter 58. This path for the document 11 is given merely by way of example, because it is readily depicted; it should be understood, however, that in the usual instance the document 11 will be fed by appropriate conventional mechanisms from an entry tray to an exit tray at a controlled speed which is synchronized with the movement of the drum 15 upon which the copy document 14 is wrapped, as in FIG. 1. For synchronization purposes, the rollers 51, 52 are driven by a roller drive 60 at a rate which is equal to that of the advance rate of the ink jet head array 47 as it is advanced along a guide rail 62 under control of a drive 64, also responsive to the synchronizing circuits 61. It should be noted that a special means may be needed to synchronize feeding of the master document 11 in synchronization with the leading edge of the copy document 14. For this purpose, the drum 15 may contain an index mechanism of conventional form, such as a magnetic or optical index, and advance of the master document past the image axis may be controlled by a gate (not shown) which is actuated whenever the index mark on the drum 15 is in appropriate position. The synchronizing circuits 61 also provide indexing signals to the drive circuit 49 which controls the galvanometer drive 41, so that the scan of the mirror 40 relative to the master document 11 can commence in appropriate time relation to the writing of patterns on the copy document 14.

In the example of FIG. 4, a bar illuminator (not shown) may be mounted beneath the document glass in fixed position relative to the image axis along the master document 11, to provide constant illumination of a transverse band across the document 11 as it is advanced. Such an arrangement is not illustrated separately because it is readily evident to those skilled in the art from the example of FIG. 1. However, as seen in FIG. 4, a scanning light source arrangement may alternatively be used that employs the same scanning mirror 40, although separate optics may alternatively be employed in conjunction with a separate scanning mirror or an extension of the scanning mirror 40 shown in FIG. 4. The light source in this example is a laser 70 providing a narrow, high intensity light beam of selected wavelength or wavelengths, this light beam being directed through a pair of lenses 72, 73 which function as a beam expander, onto a mirror 75 which deflects the beam to intercept the system optical axis. At the optical axis a beam splitter such as a dichroic mirror 76 positioned at a 45° angle reflects half the beam through the focusing lens 37 and onto the scanning mirror 40 along the optical axis. The beam is reflected upwardly through the collimating lens 35 onto the image axis as a scanning illuminating beam of sufficient diameter to encompass the width of the band being scanned. Reflected light off the master document 11 is returned along the optical axis through the collimating lens 35, scanning mirror 40, focusing lens 37 and dichroic mirror 76 to the photodetector array 43. With a laser 70 of sufficient intensity the illumination of the photodetector array 43 by reflected light is more than adequate for reliable detection.

This arrangement is mechanically superior for those situations in which it is desirable to minimize the amount of moving mass, or in which it is desirable to employ a high speed feeding arrangement for the master document 11.

Figure 5:
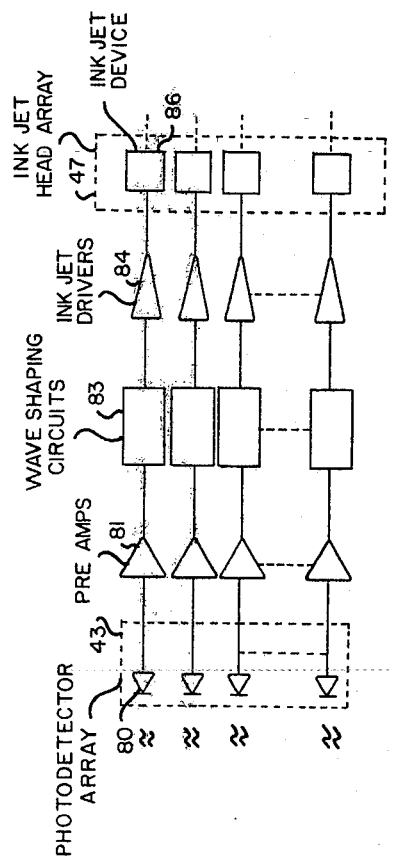
FIG. 5 is a block diagram illustrating in simplified form the electronic interconnection between a linear diode array and an ink jet array adapted for real time copying.
Figure 6:
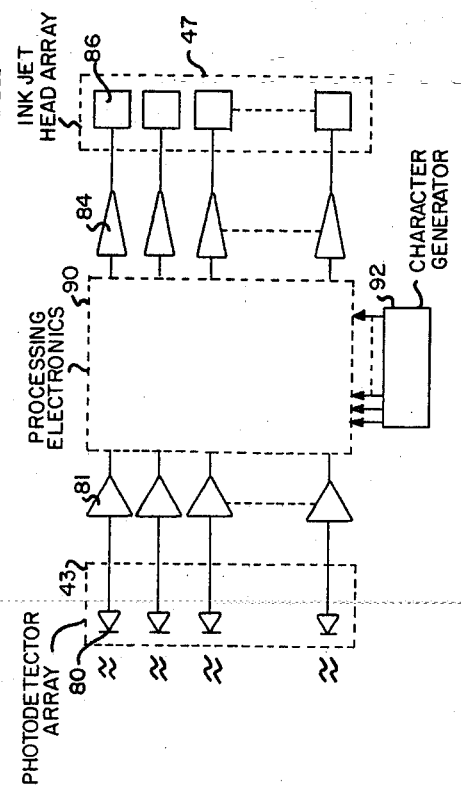
FIG. 6 is a block diagram depicting in simplified form the electronic interconnection between the linear diode array and the ink jet array of the present invention incorporating an electronic data processing means to alter and/or delay the hard copy produced by the system.

In any of the configurations in which real time recording is desired on a 1:1 basis, electronic amplifiers intercoupling the photodetector array 43 and ink jet head array 47 may be arranged as shown in FIG. 5. Each individual photodiode 80 in the array 43 may be coupled directly to a preamplifier 81, the output signal from which actuates a wave shaping circuit 83, such as a Schmitt trigger or a one shot, and the output signal then is coupled to an ink jet driver 84 which controls the actuation of an associated ink jet device 86. It is, however, feasible to further manipulate or process the signals derived from the master document so that other functions can be effected. As shown in FIG. 6, processing electronics 90 may be interposed between the pre-amps 81 and the ink jet drivers 84, to store, modify or shift the input signals prior to recording. Alternatively or in addition, a character generator 92 may be utilized to feed in signals at appropriate times to write additional information onto the copy document. The character generator 92 may, for example, comprise read only memories (ROMs) that are programmed to generate selected signal sequences corresponding to portions of individual characters or patterns, in response to selector circuits included as a part of the character generator 92. While this provides a more complex system, it substantially increases the versatility with which data may be recorded on the copy document.

In some of the examples illustrated, the current for the galvanometer driving the mirror may be applied as a triangular waveform with symmetrical ascending and descending ramps. Using this type of drive, in which the photosensitive elements and printer elements can reciprocate bidirectionally relative to their associated media, the system will then read and print as the lens system scans from left to right and then read and print the second line as the system scans from right to left. If it is desired to read the document and print only during scans in one direction, as where the copy document is on a rotating drum, a sawtooth driving current having an ascending ramp and a sharp trailing edge may be utilized, to provide a relatively slow linear sweep across the document being scanned with respect to the rapid retrace time provided by the trailing side of the sawtooth wave.

While various forms of this invention have been illustrated and described, variations and modifications may be apparent to those skilled in the art. Therefore, the scope and breadth of this invention is to be determined from the appended claims.

What is claimed is:
1. A document reproduction system comprising:
    master document support means;
    means for illuminating a band of at least a selected width along a first axis extending across the master document;
    an array of photosensitive elements;
    scanning means for scanning the illuminated band along the first axis throughout a line orthogonal thereto and extending across the width thereof, said scanning means directing each of a number of scanning line images onto the different ones of the array of photosensitive elements;
    copy document support means for supporting a copy document;
    means for scanning along a band of a display area in synchronism with the operation of the scanning means relative to the master document and comprising an array of ink jet printer elements disposed adjacent the copy document for scanning the copy document in parallel along an axis corresponding to the first axis on the master document;
    circuit means coupled to the means for scanning a display area to generate line images along the band in response to energization of the individual photosensitive elements and comprising means for energizing the individual ink jet printer elements; and means for displacing the means for illuminating, the array of photosensitive elements and the scanning means in a direction orthogonal to the first axis relative to the master document and concurrently displacing the means for scanning relative to the display area in a direction orthogonal to the first axis whereby the entire master document is scanned and an image corresponding to the master document is concurrently generated at the display area;

the means for displacing comprising a first drive system for advancing the master document past an image axis and a second drive system for advancing the copy document past a reproduction axis, wherein the means for illuminating, the scanning means and the array of photosensitive elements are held fixed relative to the image and reproduction axes, and wherein the system further includes means for synchronizing the advance of the documents with each other and the operation of the scanning means;

said means for illuminating comprising point source light means and means for directing the light against the master document through the scanning means whereby movement of the scanning means causes the light from the point source light means to sweep the master document along the band and be returned through the scanning means.

* * * * *